United States Patent [19] [11] 3,794,214
Kuparinen [45] Feb. 26, 1974

[54] PACKAGE FOR AUTOMATIC PENCIL LEADS

[75] Inventor: Lasse Kuparinen, Hamburg, Germany

[73] Assignee: Koh-I-Noor Rapidograph, Inc., Bloomsbury, N.J.

[22] Filed: Jan. 26, 1973

[21] Appl. No.: 326,902

[30] Foreign Application Priority Data

Jan. 27, 1972 Germany.......................... 7202879

[52] U.S. Cl. ............................................. 221/310
[51] Int. Cl. ............................................ B65d 83/02
[58] Field of Search ....... 221/307, 310, 64, 65, 268, 221/69, 89, 187, 197; 206/66, 67, 56 AC

[56] References Cited

UNITED STATES PATENTS

| | | | |
|---|---|---|---|
| 3,101,477 | 8/1963 | Leniz | 221/307 X |
| 3,648,891 | 3/1972 | Katz | 221/268 |

*Primary Examiner*—Stanley H. Tollberg

[57] ABSTRACT

A lead package for leads of the type used in "automatic" pencils. Particularly, a housing having a bifurcated fork portion which locks a slidable lead storage portion within the housing. The lead storage portion may be reciprocated longitudinally so as to split the bifurcated portion of the housing and thus extend the ends of the leads for removal outwardly of the front end of the housing.

7 Claims, 4 Drawing Figures

PACKAGE FOR AUTOMATIC PENCIL LEADS

BACKGROUND OF THE INVENTION

1. Field of the Invention

Disposable packages for graphite leads having a box-shaped receiving part or housing and a reciprocative inside part which contains the leads. The inside part is slidable longitudinally within the receiving part, so as to lock the stored leads within the housing or to extend the leads for removal longitudinally from the front portion of the housing. The lead package is suitable particularly for the reception of so-called "Fallminenstifte" or "drop lead points", as literally translated.

2. The prior art

Such lead packages usually are one-way or disposable packages and, therefore, one of the requirements is that they be as simple and as cheap to produce, as possible. Furthermore, they are to have the least possible number of details so that the costs of molding are low.

SUMMARY OF THE INVENTION

The present lead package of this type has been developed for this purpose in such a way that the exterior receiving or housing part is split in its front portion in a longitudinal direction and the front bifurcated parts separated by the slot are bent apart when the inside part, holding the leads, is pushed forward.

In the retracted or pulled back attitude of the inside part, the receiving part or housing in the split front bifurcated portion is closed, so that the leads contained in the inside part, e.g. in individual quivers or cylindrical recesses, cannot fall out of the lead package. If the inside part is pushed or advanced forward, then the front bifurcated portions separated by the slot, are bent or spread apart so that the leads are advanced longitudinally beyond the housing and can be removed from the inner part.

In order to simplify the shifting or sliding of the inner part within the receiving part or housing, an extension handle projecting through the receiving part can be provided at least on one side of the inside part.

In a further modification of the invention, at least in the area between the extension handle and the remaining portion of the inside part, a wedge-shaped element tapering forward and extending outwardly of the housing can be provided. Within the side edges of the slot at the level of the wedge-shaped element there are provided complementary recesses for the wedge in the pulled back or retracted position of the inside part. This wedge-shaped element serves for the bending apart of the two front bifurcated portions of the receiving part, separated by the slot, during the sliding of the inside part in a forward direction. The bending apart of the bifurcated portions by the wedge ensures that any leads possibly projecting from the inside part will not break or come into contact with the receiving part or front portion, which is initially closed during this shifting movement.

In order to limit the longitudinal movement of the extension handle and thus of the inside part a leading and a trailing shoulder edge can be provided in the receiving part or housing.

DESCRIPTION OF THE PREFERRED EMBODIMENTS

The lead package shown consists of a box-shaped receiving part 1 and an inside part 2 that is slidable within limits within said receiving part 1. Inside part 2 there are leads 8 for "drop lead points". The receiving part 1 is approximately in the shape of a box and can be, for example, open in the area of the rear transverse wall not shown, while the front portion or bifurcated portion is split in a longitudinal direction as can be seen particularly from FIGS. 2 and 3. The front portion of receiving part 1 consisting of one piece and formed by the slot, can be bent apart as a result of that.

Figure 2:
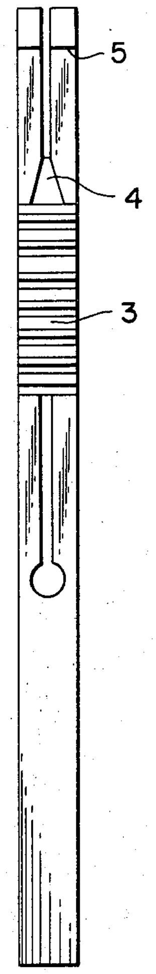
FIG. 2 is a side elevation of the lead package, according to FIG. 1.
Figure 3:
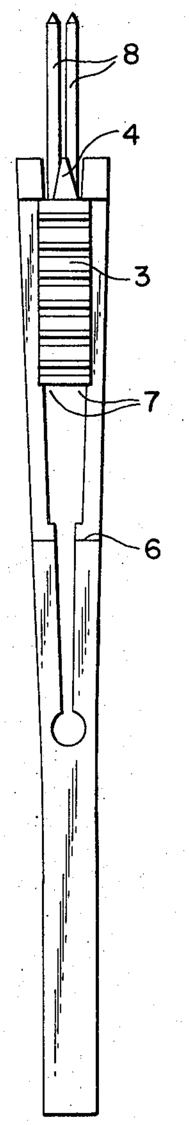
FIG. 3 is a side elevation of the lead package, according to FIG. 2 in its open state.
Figure 4:
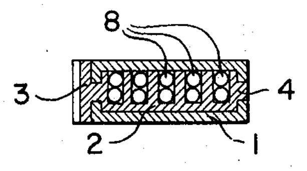
FIG. 4 is a vertical sectional view taken along line IV—IV of FIG. 1.

As a result of the spreading of the front portion of receiving part 1, separated by the slot, the inside part 2 can be reciprocated into the receiving part 1, in the position illustrated in FIG. 2, the separated front portions because of their elasticity have returned into their rest position. The inserted inside part 2 has an extension handle 3 extending laterally outward. Handle extension 3 enables shifting or reciprocating of the inside parts in a longitudinal direction and, also, limits this reciprocation between the leading and the trailing edges of receiving part 1. Between the extension handle 3 and inside part 2, as well as in the area of the slot in the front portion, there is provided, in addition, a wedge-shaped element 4 on each side. Wedge shaped element 4 atop handle 3 serves for spreading the bifurcated portion of receiving part 1, as illustrated in FIG. 3.

Figure 1:
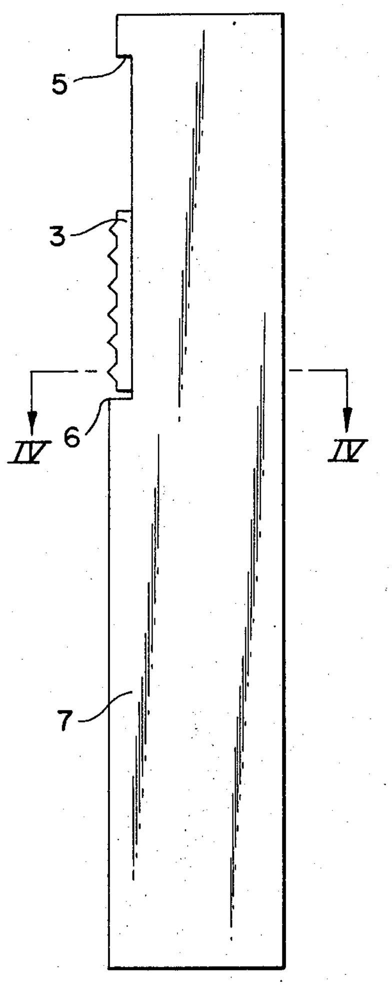
FIG. 1 is a plan view of a lead package according to the invention.

Whenever extension handle 3 is pulled back from the leading edge stop 5 to the trailing limiting edge stop 6 (FIGS. 1 and 2), then the two wedge-shaped elements 4 are inoperative, since recesses 7 are provided in the side edges of the slot. Recesses 7 receive the wedge-shaped elements 4 in the pulled back position, so that the front bifurcated portions of receiving part 1 are not spread apart, as illustrated in FIG. 2.

One can see, therefore, that the front bifurcated portions of receiving part 1 in the pulled back or retracted in locked position of inner part 2 are in a rest or inactive position and receiving part 1 is closed, so that no leads can be taken out. By pushing inside part 2 forward into the position illustrated in FIG. 3, the front bifurcated portions of receiving part 1 are spread apart by means of the wedge-shaped elements 4 and leads can be taken out.

I claim:

1. A lead package of the type adapted for storing and selectively dispensing leads comprising:

A. a housing defining:

i. an inner reciprocating chamber; and ii. a bifuracted end, communicating with said chamber; and B. an interior lead storage slide containing a plurality of lead storage recesses and reciprocable within said housing so as to be locked within said chamber in one attitude and so as to bend apart said bifurcated portion in its other attitude, with stored lead ends extended for removal beyond the front portion of said housing.

2. A lead package of the type adapted for storing and selectively dispensing leads as claimed in claim 1

B. a handle extending laterally of said bifurcated portion of said housing as an assistance in reciprocating said lead storage portion within said housing.

3. A lead package of the type adapted for storing and selectively dispensing leads as claimed in claim 2, said lead storage portion including at least one wedge-shaped element adjacent said handle and engagable with a slot defined by said bifurcated portion, so as to bend apart said bifurcated portions, as said handle and lead storage portion are reciprocated towards the front end of said housing.

4. A lead package of the type adapted for storing and selectively dispensing leads as claimed in claim 3, said bifurcated portion being defined by a longitudinally extending slot at the forward end of said housing and including opposed side recesses at the mid-portion of said slot, so as to accommodate said handle extension in its retracted or locked attitude without bending of said bifurcated portion.

5. A lead package of the type adapted for storing and selectively dispensing leads as claimed in claim 4, wherein a laterally extending wedge is provided on each side of said inside portion, so as to extend laterally of said housing and to simultaneously abut and bend said bifurcated portion, as said lead storage portion is reciprocated outwardly of said housing.

6. A lead package of the type adapted for storing and selectively dispensing leads as claimed in claim 5, wherein said housing includes forward and rear limiting edges, defining the path of longitudinal reciprocation of said handle extension.

7. A lead package of the type adapted for storing and selectively dispensing leads as claimed in claim 6, said bifurcated portion and said slot in said housing extending from a portion of said housing below said handle to the front end of the housing, such that there is bending of the bifurcated portion of the housing from below its mid-portion to its free forward bifurcated ends.

* * * * *